(12) United States Patent
Russell et al.

(10) Patent No.: US 6,824,144 B2
(45) Date of Patent: Nov. 30, 2004

(54) KNEELING VALVE

(75) Inventors: Neil Russell, Bloomfield Hills, MI (US); Joseph E. Foster, Sterling Heights, MI (US)

(73) Assignee: Ross Operating Valve Company, Troy, MI (US)

( * ) Notice: Subject to any disclaimer, the term of this patent is extended or adjusted under 35 U.S.C. 154(b) by 57 days.

(21) Appl. No.: 10/407,091

(22) Filed: Apr. 3, 2003

(65) Prior Publication Data
US 2003/0193149 A1 Oct. 16, 2003

Related U.S. Application Data

(60) Provisional application No. 60/373,061, filed on Apr. 16, 2002.

(51) Int. Cl.[7] .............................................. B60G 17/00
(52) U.S. Cl. ................................................... 280/6.152
(58) Field of Search .......................... 280/6.152, 6.151, 280/6.153, 124, 157, 124.158, DIG. 1

(56) References Cited

U.S. PATENT DOCUMENTS 4,341,398 A * 7/1982 Condon et al. .......... 280/6.152
5,344,189 A * 9/1994 Tanaka et al. ........... 280/6.152
6,669,216 B1 * 12/2003 Elser et al. ........... 280/124.106

* cited by examiner

Primary Examiner—Faye M. Fleming
(74) Attorney, Agent, or Firm—Harness, Dickey & Pierce (57) ABSTRACT

A kneeling valve assembly for transport vehicles to enable a quick and convenient kneeling operation to permit safe ingress and egress from the vehicle. The kneeling valve assembly employs a suspension member positioned between the vehicle body and the axle of the transport vehicle to raise and lower the transport vehicle relative to a ground level. The kneeling valve assembly includes a first valve that is operable to selectively permit fluid flow between the inlet passage and the suspension member to raise the transport vehicle relative to the ground level. A second valve is provided that is operable to selectively permit fluid flow between the suspension member and the exhaust passage to lower the transport vehicle relative to the ground level. A leveling trigger is fluidly coupled to the inlet passage and is operable to determine a height of the transport vehicle relative to the ground level. Finally, a third valve is provided that is operable to selectively permit fluid flow between the inlet passage and the suspension member to maintain a predetermined height above the ground level.

18 Claims, 9 Drawing Sheets

KNEELING VALVE

CROSS-REFERENCE TO RELATED APPLICATIONS

This application claims the benefit of U.S. Provisional Application No. 60/373,061, filed on Apr. 16, 2002 The disclosure of the above application is incorporated herein by reference.

FIELD OF THE INVENTION

The present invention generally relates to vehicle suspensions and, more particularly, relates to vehicle suspension capable of providing a kneeling function.

BACKGROUND OF THE INVENTION

As is well known, transit vehicles, such as buses, occasionally employ means to aid the elderly or handicap board the vehicle. Although ramps and lifts have often been used, recently there has been a renewed interest in systems that enable the transit vehicle to be lowered. Theses systems are often known as kneeling systems, since they enable the transit vehicle to "kneel" toward the ground.

Kneeling systems often include a control device that actuates a plurality of pneumatic or hydraulic members to lower the step height of the transit vehicle to permit easy ingress and egress and later raising the vehicle back up for conventional locomotion. These kneeling systems may serve a dual purpose of also providing a leveling mechanism that automatically maintains a predetermined relationship between the vehicle chassis and the road wheels. Although these systems are generally satisfactory, there is a desire to provide a simplified and cost effective alternative to the conventional, rather complicated systems.

Accordingly, there exists a need in the relevant art to provide a kneeling valve assembly for use in a transit vehicle that is capable of lowering and raising a transit vehicle to aid in ingress to and egress from the vehicle. Furthermore, there exists a need in the relevant art to provide a kneeling valve assembly that is simplified and cost-effective to operate and maintain. Still further, there exists a need in the relevant art to provide a kneeling valve assembly that overcomes the disadvantages of the prior art.

SUMMARY OF THE INVENTION

According to the principles of the present invention, a kneeling valve assembly for transport vehicles is provided having an advantageous construction so as to enable quick and convenient kneeling operation of the transport vehicle to permit safe ingress and egress from the vehicle. The kneeling valve assembly employs a suspension member positioned between the vehicle body and the axle of the transport vehicle to raise and lower the transport vehicle relative to a ground level. The kneeling valve assembly includes a first valve that is operable to selectively permit fluid flow between the inlet passage and the suspension member to raise the transport vehicle relative to the ground level. A second valve is provided that is operable to selectively permit fluid flow between the suspension member and the exhaust passage to lower the transport vehicle relative to the ground level. A leveling trigger is fluidly coupled to the inlet passage and is operable to determine a height of the transport vehicle relative to the ground level. Finally, a third valve is provided that is operable to selectively permit fluid flow between the inlet passage and the suspension member to maintain a predetermined height above the ground level.

Further areas of applicability of the present invention will become apparent from the detailed description provided hereinafter. It should be understood that the detailed description and specific examples, while indicating the preferred embodiment of the invention, are intended for purposes of illustration only and are not intended to limit,the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Referring now to the drawings in which like reference numerals designate like or corresponding parts throughout the several views, there is shown a kneeling system, which is designated generally by the reference numeral 10. Kneeling system 10 is intended for use in a transit vehicle 12, such as a bus or van; however, kneeling system 10 may be provided in any vehicle where there is a desire to provide a kneeling function. Accordingly, although the specific recitation contained herein is directed to a kneeling incorporated into a bus, it should be understood that the present invention may find utility in a wide variety of applications.

Figure 4:
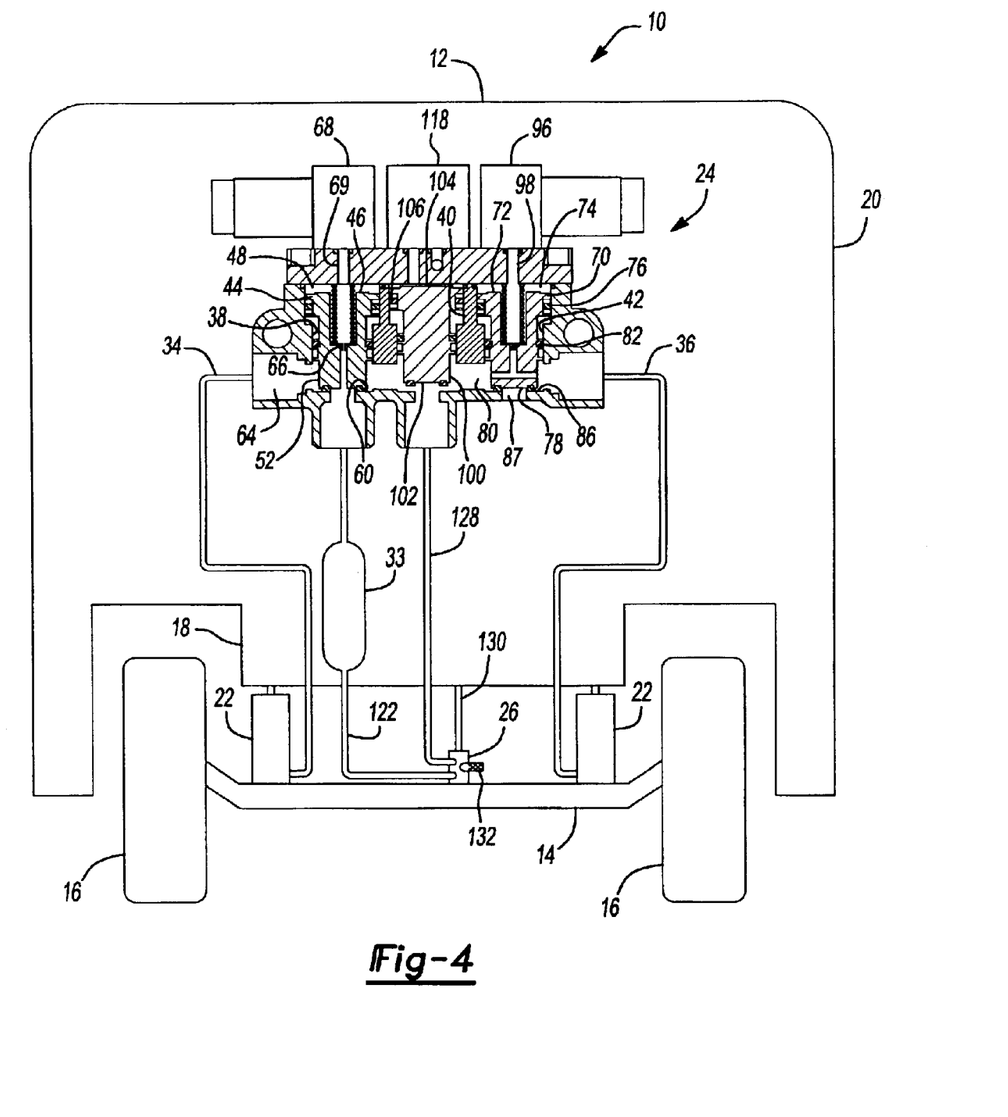
FIG. 4 is a fluid circuit of a kneeling system of the present invention incorporated into a transit vehicle shown in a normal run position.

Briefly, with reference to FIG. 4, transit vehicle 12 generally includes a front and rear axle 14 (only one shown) and a pair of wheels 16 disposed on opposing ends of axle 14. Additionally, transit vehicle 12 includes a chassis 18, a body structure 20 disposed on and coupled to chassis 18, and a pair of suspension members 22 disposed between axle 14 and chassis 18 for use in accordance with the principles of the present invention. It should be understood that suspension members 22 may be hydraulically, pneumatically, or mechanically based actuators, such as airbags, air shocks, hydraulic lift assemblies, screw drives, and the like.

Figure 1:
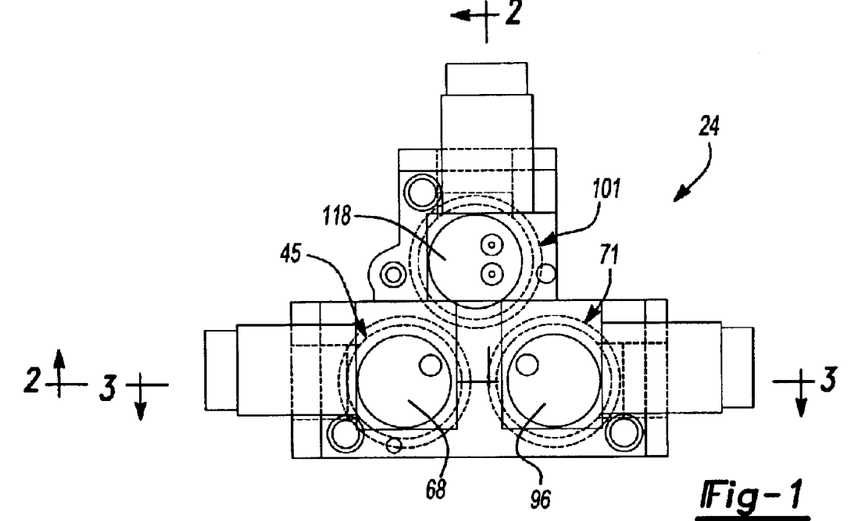
FIG. 1 is a plan view illustrating a kneeling valve assembly according to the principles of the present invention.
Figure 2:
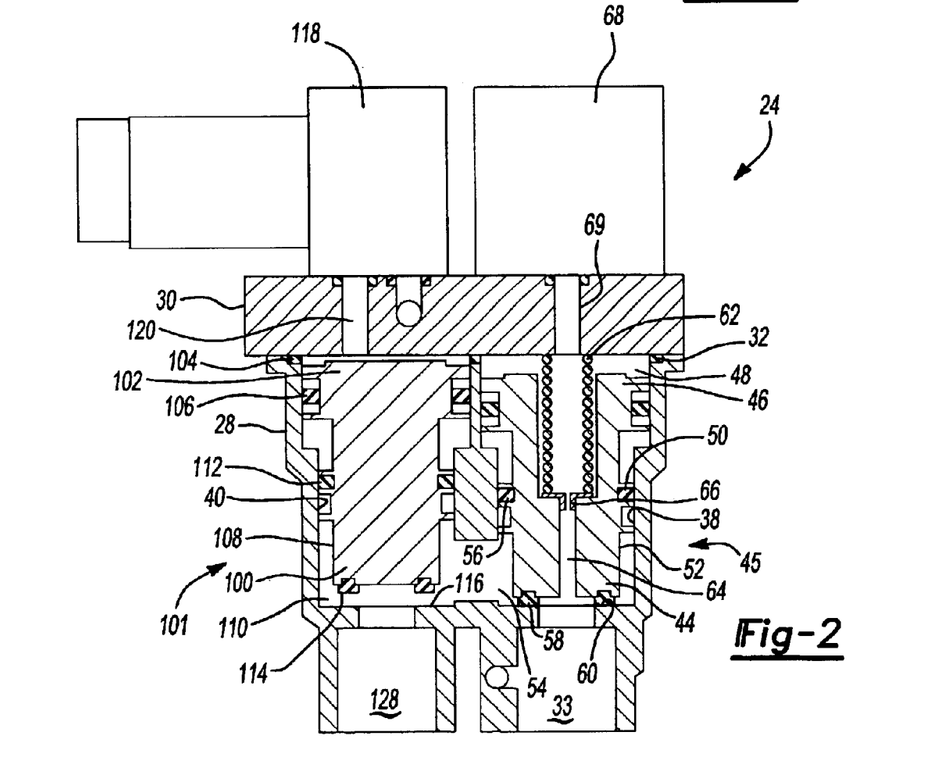
FIG. 2 is a cross sectional view illustrating the kneeling valve assembly of FIG. 1 taken along lines 2—2.
Figure 3:
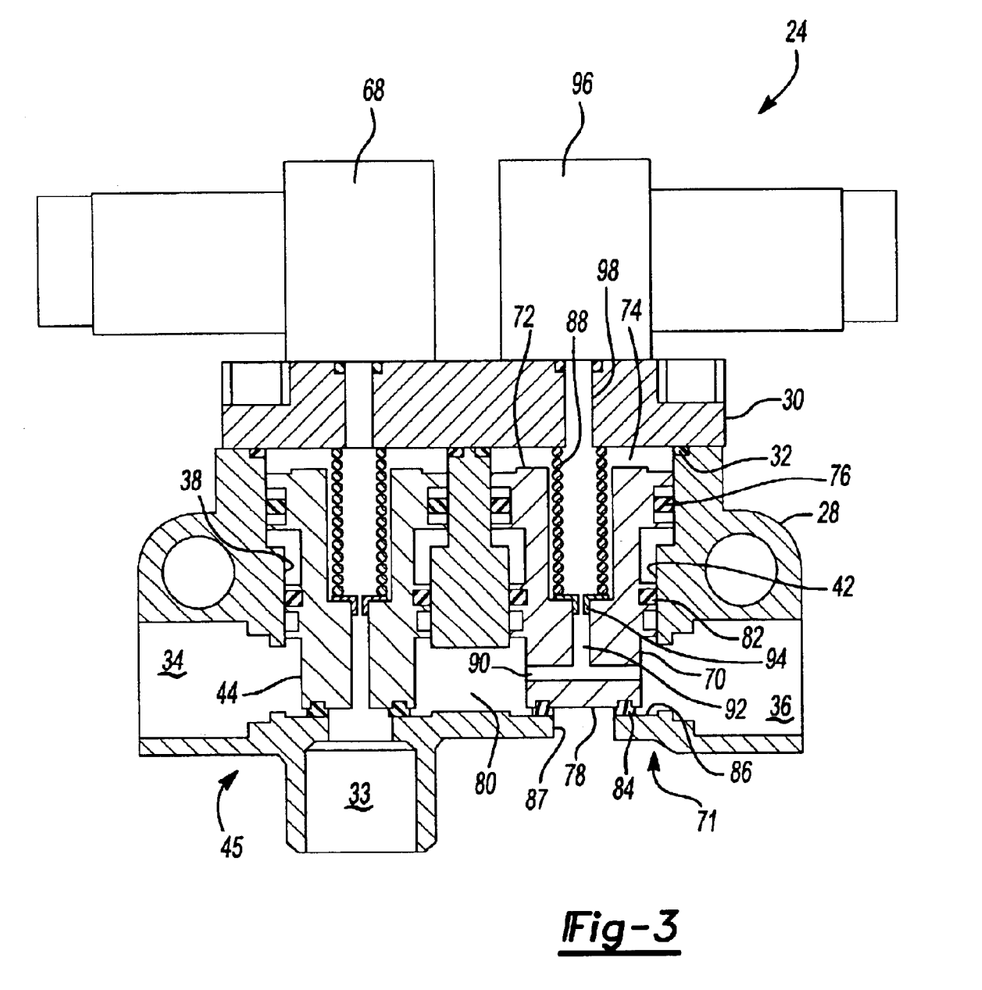
FIG. 3 is a cross sectional view illustrating the kneeling valve assembly of FIG. 1 taken along lines 3—3.

Referring in particular to FIGS. 1–3, kneeling system 10 primarily contains a kneeling valve assembly 24, a plurality of fluid passages interconnecting kneeling valve assembly 24 to suspension members 22, and a mechanical leveling trigger 26 (FIG. 4). Kneeling valve assembly 24 includes a main body portion 28 and an upper end cap 30. Upper end cap 30 is positioned adjacent to and in contact with main body portion 28. A seal 32 is disposed between upper end cap 30 and main body portion 28 to seal the interface therebetween.

Kneeling valve assembly 24 further includes an inlet supply 33, a first fluid outlet passage 34 (FIG. 4), a second fluid outlet passage 36 (FIG. 4), and a plurality of valve bores disposed within main body portion 28. Specifically, kneeling valve assembly 24 includes a supply valve bore 38, a leveling valve bore 40, and an exhaust valve bore 42. First fluid outlet passage 34 and second fluid outlet passage 36 each extend between kneeling valve assembly 24 and suspension members 22 to provide fluid communication therebetween.

A supply poppet member 44 is slidably disposed within supply valve bore 38 to form supply valve 45. More particularly, supply poppet member 44 includes a base portion 46 disposed in an upper chamber 48 of supply valve bore 38. A seal 50 is disposed alongside base portion 46 in upper chamber 48, which seals upper chamber 48 from first fluid outlet passage 34. Supply poppet member 44 further includes a face portion 52 slidably disposed in a lower chamber 54 of supply valve bore 38. A seal 56 is disposed alongside face portion 52 in lower chamber 54, which seals upper chamber 48 from first fluid outlet passage 34. Face portion 52 further includes a seal 58 that engages a seat 60 of main body portion 28 to isolate supply pressure 33 from suspension members 22.

Supply poppet member 44 is normally biased via a spring 62 and backpressure into a seated position wherein face portion 52 of supply poppet member 44 contacts seat 60 of main body portion 28 to prevent fluid flow between supply pressure 33 and first fluid outlet passage 34 and second fluid outlet passage 36. As will be described below, supply poppet member 44 is further positionable to an unseated position where face portion 52 of supply poppet member 44 is spaced apart from seat 60 of main body portion 28 to enable fluid flow between inlet supply 33 and first fluid outlet passage 34 and second fluid outlet passage 36. Supply poppet member 44 still further includes a fluid passage 64 formed through face portion 52 to enable fluid to flow between inlet supply 33 and upper chamber 48. However, a restrictor 66 is disposed within fluid passage 64 to restrict fluid flow therethrough. A supply valve solenoid 68 is further provided in fluid communication with upper chamber 48 of supply valve bore 38 via an outlet pilot passage 69 to rapidly exhaust fluid pressure in upper chamber 48. As may be readily appreciated by those skilled in the art, varying style pilots may be used in place of supply poppet member 44.

An exhaust poppet member 70 is slidably disposed within exhaust valve bore 42 to form exhaust valve 71. More particularly, exhaust poppet member 70 includes a base portion 72 disposed in an upper chamber 74 of exhaust valve bore 42. A seal 76 is disposed alongside base portion 72 in upper chamber 74. Exhaust poppet member 70 further includes a face portion 78 slidably disposed in a lower chamber 80 of exhaust valve bore 42. A seal 82 is disposed alongside face portion 78 in lower chamber 80. Face portion 78 further includes a seal 84 that engages a seat 86 of main body portion 28 to isolate suspension members 22 from an exhaust port 87.

Exhaust poppet member 70 is normally biased via a spring 88 and backpressure into a seated position wherein face portion 78 of exhaust poppet member 70 contacts seat 86 of main body portion 28 to prevent fluid flow between first and second fluid outlet passages 34 and 36 and exhaust port 87. As will be described below, exhaust poppet member 70 is further positionable to an unseated position where face portion 78 of exhaust poppet member 70 is spaced apart from seat 86 of main body portion 28 to enable fluid flow between first and second fluid outlet passages 34 and 36 and exhaust port 87. Exhaust poppet member 70 still further includes a first fluid passage 90 and an interconnecting fluid passage 92, formed in a T-shape through face portion 78 to enable fluid to flow between upper chamber 74 and first and second fluid outlet passages 34 and 36. However, a restrictor 94 is disposed within fluid passage 90 to restrict fluid flow therethrough. An exhaust valve solenoid 96 is further provided in fluid communication with upper chamber 74 of exhaust valve bore 42 via an outlet pilot passage 98 to rapidly exhaust fluid pressure in upper chamber 74.

A leveling poppet member 100 is slidably disposed within leveling valve bore 40 to form leveling valve 101. More particularly, leveling poppet member 100 includes a base portion 102 disposed in an upper chamber 104 of leveling valve bore 40. A seal 106 is disposed alongside base portion 102 in upper chamber 104, which seals upper chamber 104 from first and second fluid outlet passages 34 and 36. Leveling poppet member 100 further includes a face portion 108 slidably disposed in a lower chamber 110 of leveling valve bore 40. A seal 112 is disposed alongside face portion 108 in lower chamber 110, which seals upper chamber 104 from first and second fluid outlet passages 34 and 36. Face portion 108 further includes a seal 114 that engages a seat 116 of main body portion 28 to fluidly isolate suspension members 22 from mechanical leveling trigger 26.

Leveling poppet member 100 is normally biased via fluid pressure from mechanical leveling trigger 26 into an unseated position wherein face portion 108 of leveling poppet member 100 is spaced apart from seat 116 of main body portion 28 to enable fluid flow between mechanical leveling trigger 26 and first and second fluid outlet passages 34 and 36. As will be described below, leveling poppet member 100 is further positionable to a seated position where face portion 108 of leveling poppet member 100 contacts seat 116 of main body portion 28 to prevent fluid flow between mechanical leveling trigger 26 and first and second fluid outlet passages 34 and 36. A leveling valve solenoid 118 is further provided in fluid communication with upper chamber 104 of leveling valve bore 40 via an outlet pilot passage 120 to provide a pilot pressure to upper chamber 104.

Lastly, mechanical leveling trigger 26 is illustrated being fluidly coupled between inlet supply 33 and leveling valve bore 40. When mechanical leveling trigger 26 is opened, fluid from inlet supply 33 flows through supply passage 122 and mechanical leveling trigger 26 and into a leveling passage 128. Leveling passage 128 in turn is in fluid communication with normally-opened leveling valve bore 40 and, thus, suspension members 22. Furthermore, mechanical leveling trigger 26 includes a trigger arm or switch 130 operably coupled to mechanical leveling trigger 26. Trigger arm 130 is engaged or at least contacts chassis 18 to determine the height of chassis 18 relative to axle 14. Trigger arm 130 is thus serves to open or close mechanical leveling trigger to achieve a predetermined height of chassis 18 relative to axle 14. Mechanical leveling trigger 26 still further includes an exhaust 132 for exhausting fluid pressure to lower chassis 18. Varying methods for sensing the height of chassis 18 relative to axle 14 may be used.

OPERATION

FIG. 4 illustrates kneeling system 10 in its deactuated or neutral position with only an equalized pressure supplied to both suspension members 22. In this position, spring 62 and a constant fluid pressure in upper chamber 48 of supply valve bore 38 biases supply poppet member 44 downward such that face portion 52 of supply poppet member 44 is seated against seat 60 of main body portion 28, thereby closing fluid communication between inlet supply 33 and first and second fluid outlet passages 34 and 36. In the preferred embodiment, second fluid outlet passages 34 and 36 are two separate pieces as is shown in FIG. 4 to provide better fluid flow without the flow restrictions of the "T"-shaped piping of the prior art. Similarly, spring 88 biases exhaust poppet member 70 downward such that face portion 78 of exhaust poppet member 70 is seated against seat 86 of main body portion 28, thereby closing communication between first and second fluid outlet passages 34 and 36 and exhaust port 87. Leveling poppet member 100 is in a raised position such that face portion 108 is unseated from seat 116 of main body portion 28 as a result of increased fluid pressure within leveling passage 128 acting upon face portion 108 of leveling poppet member 100 and the general absence of fluid pressure within upper chamber 104 of leveling valve bore 40. As should be appreciated, in this state supply valve solenoid 68, exhaust valve solenoid 96, and the leveling valve solenoid 118 are each deactuated. However, as can be seen in FIG. 4, supply valve solenoid 68, when deactuated, is normally closed to prevent exhaust of fluid in upper chamber 48 of supply valve bore 38. Moreover, in this state, first fluid outlet passage 34, second fluid outlet passage 36, upper chamber 74 of exhaust valve bore 42, and leveling passage 128 are each at an equilibrium system pressure, which is typically greater than ambient.

Figure 5:
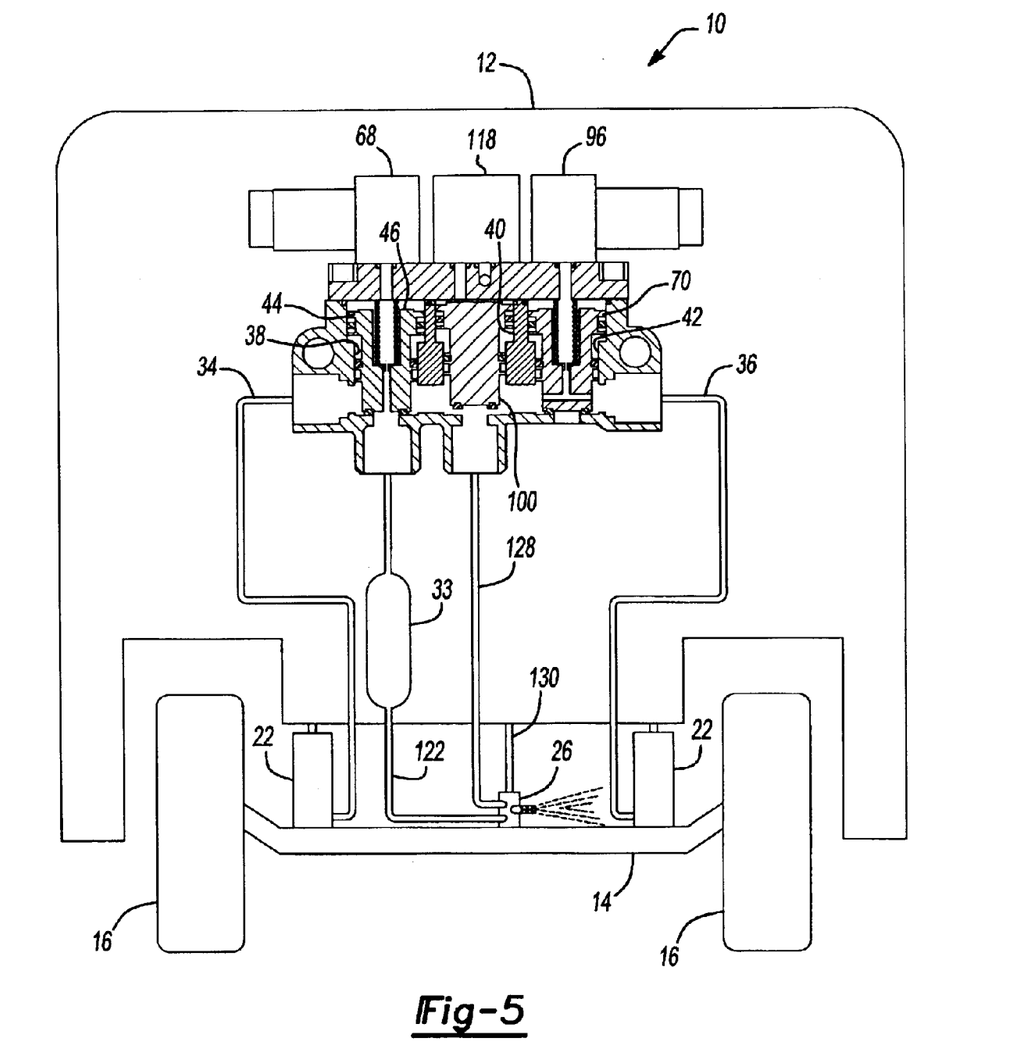
FIG. 5 is a fluid circuit of the kneeling system incorporated in the transit vehicle shown in a high position.

FIG. 5 illustrates the state where chassis 18 is too high relative to axle 14, thereby triggering trigger arm 30 to exhaust fluid pressure from leveling passage 128, which is in fluid communication with first and second fluid outlet passages 34 and 36 and suspension members 22. Accordingly, such exhaustion of fluid pressure from suspension members 22 causes suspension members 22 to deflate, thereby lowering chassis 18 relative to axle 14.

Figure 6:
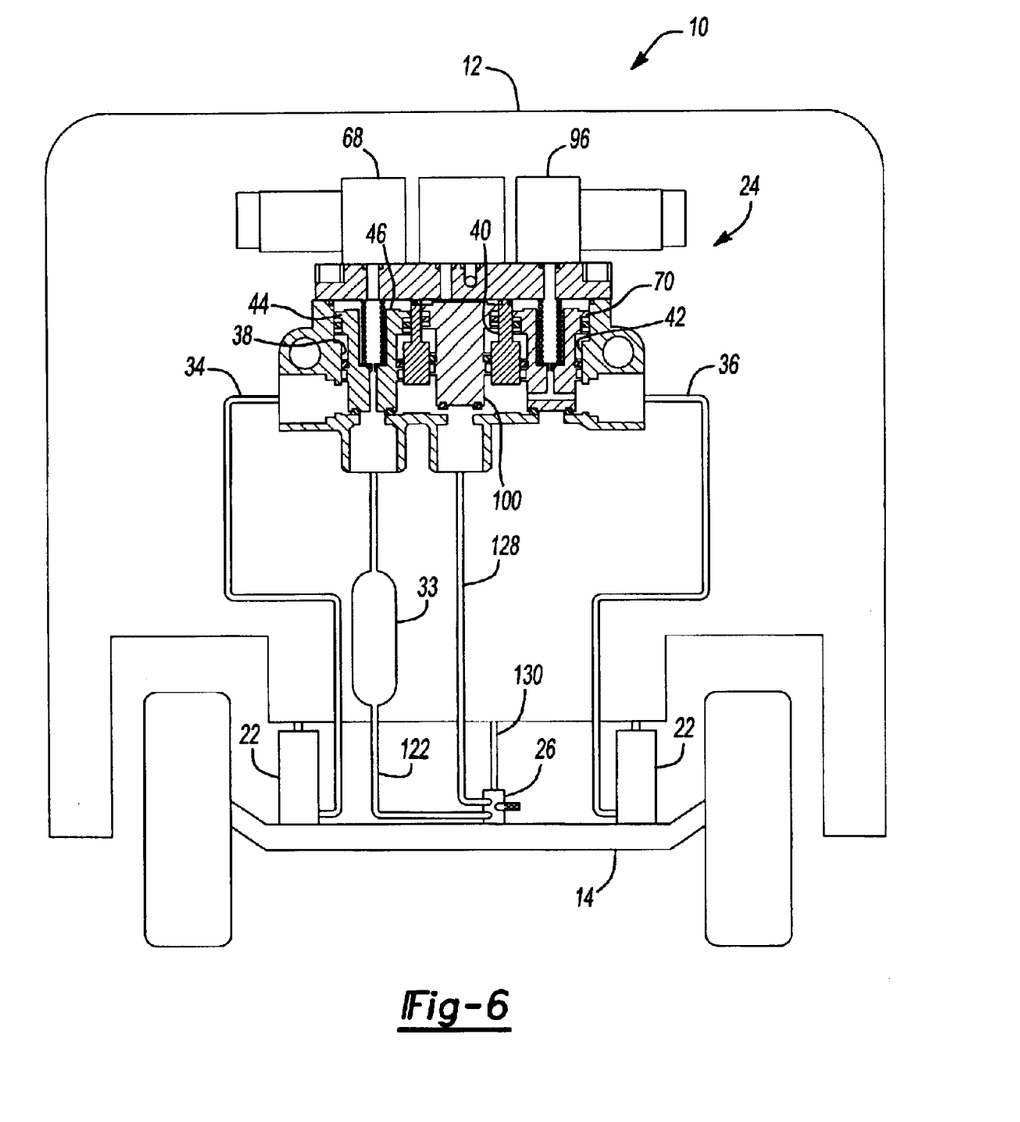
FIG. 6 is a fluid circuit of the kneeling system incorporated in the transit vehicle shown in a low position.

On the other hand, as seen in FIG. 6, when chassis 18 is too low relative to axle 14, trigger arm 30 opens mechanical leveling trigger 26 such that fluid from inlet supply 33 is permitted to flow through mechanical leveling trigger 26 via supply passage 122 to leveling passage 128. Since leveling poppet member 100 is normally positioned in an upward position due to the fluid pressure acting upon face portion 108 of leveling poppet member 100, the fluid within leveling passage 128 may flow through first and second outlet passages 34 and 36 to inflate suspension members 22.

Figure 7:
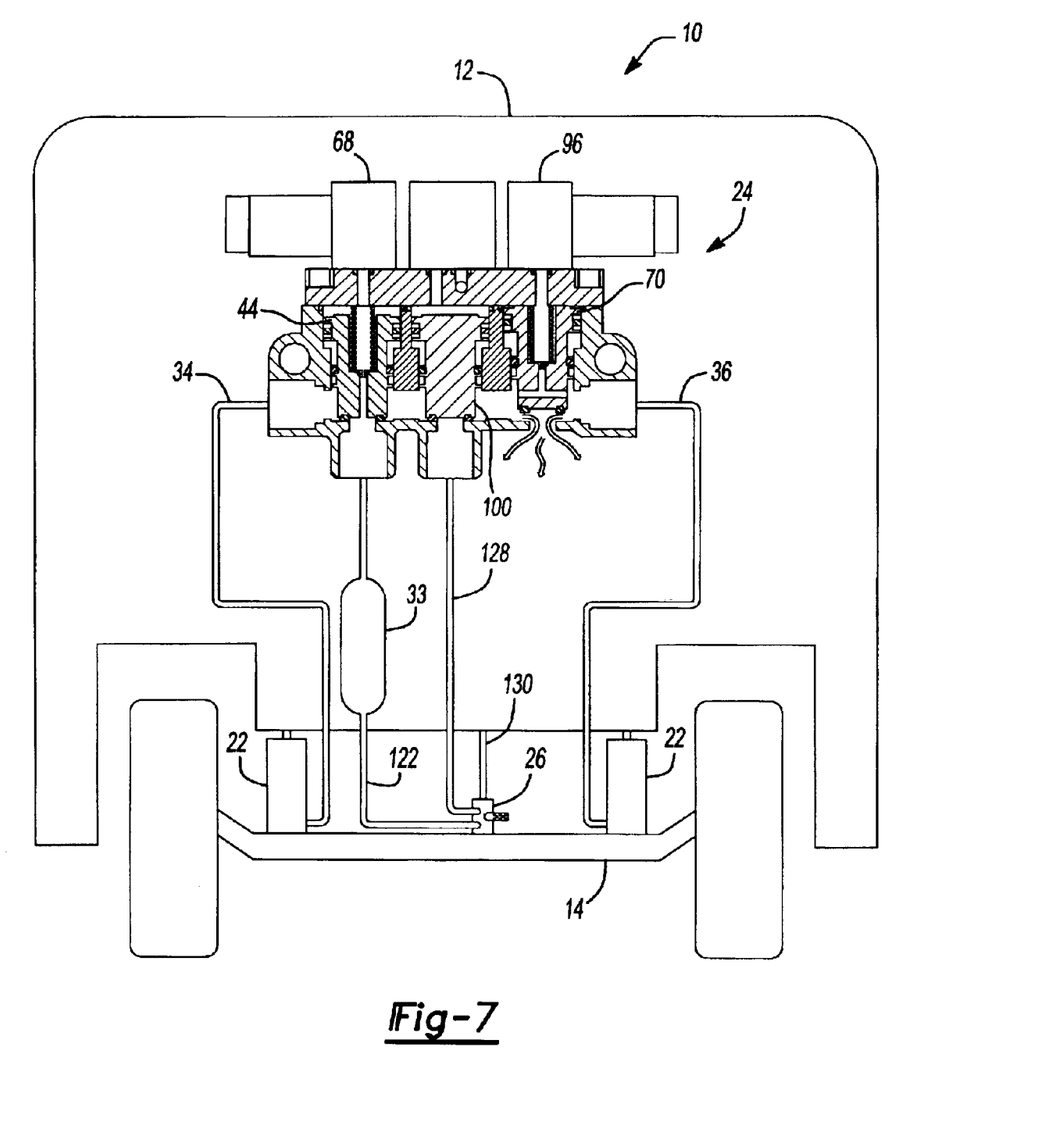
FIG. 7 is a fluid circuit of the kneeling system incorporated in a transit vehicle during a kneeling operation.

FIG. 7 illustrates the state where transit vehicle 12 assumes a kneeling position. That is, a position where suspension members 22 are deflated to lower chassis 18 relative to 14 to decrease a stepping height between the ground and transit vehicle 12. In this kneeling position, ingress and egress is made easier for the handicapped and the elderly. To this end, leveling valve solenoid 118 is actuated to apply a pilot pressure through outlet pilot passage 120 and into upper chamber 104 of leveling valve bore 40. This pilot pressure, which is generally equal to or greater than the outlet pressure of mechanical leveling trigger 26, acts upon a greater surface area formed along base portion 102 of leveling poppet member 100. The force generated by the pressure acting upon base portion 102 of leveling poppet member 100 is greater than the upward force generated by the same pressure acting upon a smaller surface area of face portion 108 of leveling poppet member 100. Therefore, the net force is downward, thereby positioning leveling poppet member 100 in a seated position wherein face portion 108 engages seat 116. In this position, leveling poppet member 100 isolates mechanical leveling trigger 26 from first and second fluid outlet passages 34 and 36, thereby preventing mechanical leveling trigger 26 from commanding an inflating action.

While leveling poppet member 100 isolates mechanical leveling trigger 26, exhaust valve solenoid 96 is actuated to open the normally closed exhaust passed coupled to upper chamber 74 of exhaust valve bore 42. That is, actuation of exhaust valve solenoid 96 vents the fluid pressure from upper chamber 74 of exhaust valve bore 42, thereby allowing fluid pressure from first and second outlet passages 34 and 36 to force exhaust poppet member 70 upward against the biasing force of spring 88, thereby opening exhaust port 87. In this state, fluid pressure from suspension members 22 is exhausted through first and second outlet passages 34 and 36 to exhaust port 87 so as to deflate suspension members 22 and lower transit vehicle 12.

Figure 8:
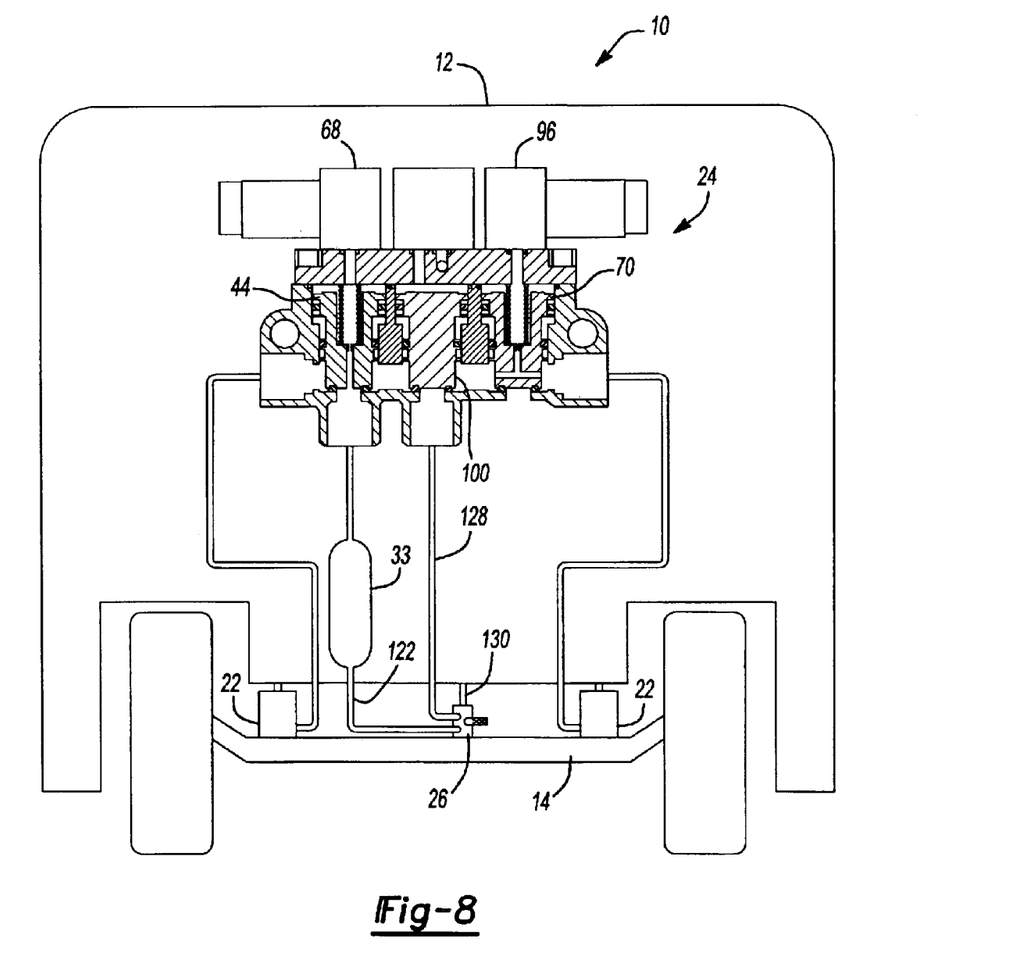
FIG. 8 is a fluid circuit of the kneeling system incorporated in a transit vehicle being held in the kneeling position.

As best seen in FIG. 8, transit vehicle 12 is held in this kneeling position by deactuating exhaust valve solenoid 96, thereby equalizing the fluid pressure in upper chamber 74 of exhaust valve bore 42 relative to the fluid pressure within first and second fluid outlet passages 34 and 36 by allowing fluid flow into upper chamber 74 via passages 90 and 92. Accordingly, with this equalized fluid pressure acting on exhaust poppet member 70, the biasing force of spring 88 forces exhaust poppet member 70 into a seated position wherein face portion 78 engages seat 86. In this seated position, exhaust port 87 is then closed and further evacuation of fluid pressure from suspension members 22 is prevented. However, leveling valve solenoid 118 remains in an actuated position whereby fluid pressure is applied to base portion 102 of leveling poppet member 100, thereby seating face portion 108 against seat 116. In this position, leveling poppet member 100 continues to isolate mechanical leveling trigger 26, thereby preventing mechanical leveling trigger 26 from commanding a raising action.

Figure 9:
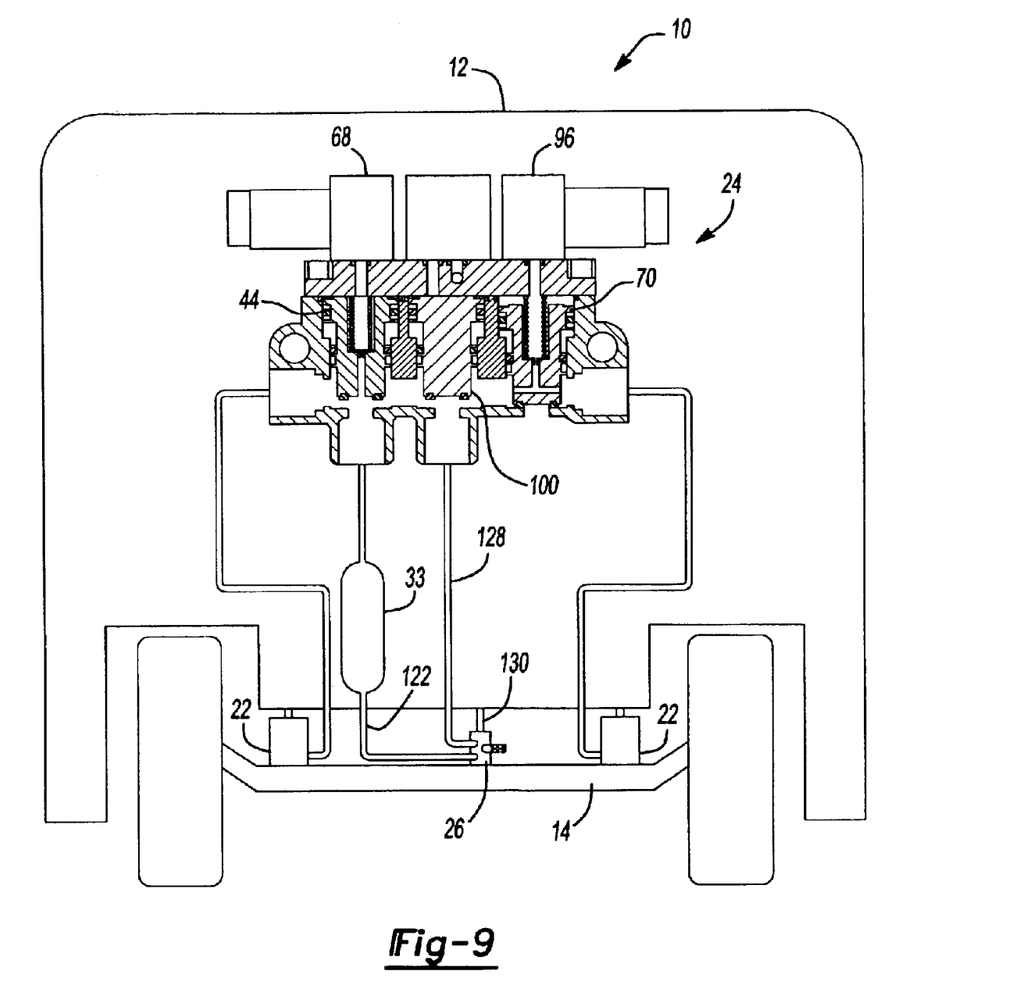
FIG. 9 is a fluid circuit of the kneeling system incorporated in a transit vehicle during a raising operation.

FIG. 9 illustrates when transit vehicle 12 is raised from the kneeling position. To this end, leveling valve solenoid 118 is deactuated, thereby removing the fluid pressure from upper chamber 104 of leveling valve bore 40. Accordingly, leveling poppet member 100 is forced to an unseated position by the fluid pressure acting against face portion 108 from leveling passage 128. Simultaneously, supply valve solenoid 68 is actuated to exhaust fluid pressure in upper chamber 48 of supply valve bore 38. Accordingly, the fluid pressure within inlet supply 33 and supply passage 122 acts upon face portion 52 of supply poppet member 44, thereby forcing supply poppet member 44 upward against the biasing force of spring 62. In this state, pressurized fluid from inlet supply 33 is permitted to flow to first and second fluid outlet passages 34 and 36, finally inflating suspension members 22, thereby raising chassis 18 relative to axle 14.

Figure 10:
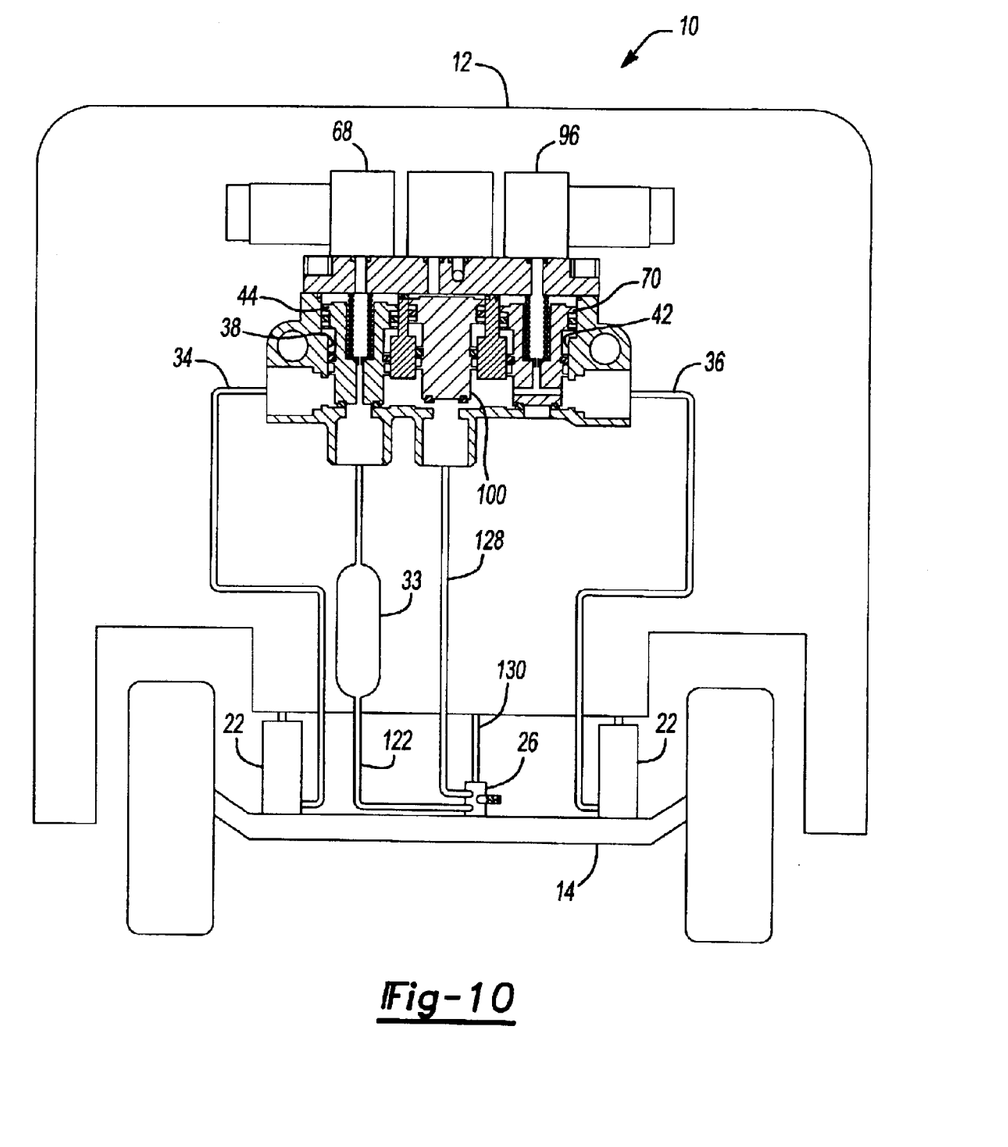
FIG. 10 is a fluid circuit of the kneeling system incorporated into a transit vehicle having been returned to a normal run position.

Once transit vehicle 12 is raised from the kneeling position, as seen in FIG. 10, supply valve solenoid 68 is then deactuated to again prevent the exhaust of pressurized fluid within upper chamber 48 of supply valve bore 38 so as to equalize the pressure above and below supply poppet member 44, thereby permitting spring 62 to bias supply poppet member 44 downward into the seated position. As can be seen from FIG. 10, the kneeling operation is now complete and mechanical leveling trigger 26 is again permitted to maintain the proper level of transit vehicle 12 as described above with reference to FIGS. 5 and 6.

Accordingly, the kneeling system of the present invention provides a number of unique advantages over conventional kneeling systems. That is, the kneeling system of the present invention provides a simple and convenient method of raising and lowering a transit vehicle to aid an ingress to and egress from the vehicle. Furthermore, the kneeling system of the present invention provides a kneeling valve assembly that is simplified and cost effective to operate and maintain.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A kneeling system for a transport vehicle, said transport vehicle having a suspension member coupled between a chassis and a wheel of said transport vehicle, said kneeling system comprising:
   an inlet passage;
   an exhaust passage;
   a supply valve fluidly connectable between said inlet passage and the suspension member, said supply valve being positionable in a first position preventing fluid flow between said inlet passage and the suspension member and a second position permitting fluid flow between said inlet passage and the suspension member;
   an exhaust valve fluidly connectable between said exhaust passage and the suspension member, said exhaust valve being positionable in a first position preventing fluid flow between the suspension member and said exhaust passage and a second position permitting fluid flow between the suspension member and said exhaust passage;
   a leveling trigger fluidly coupled to said inlet passage; and
   a leveling valve fluidly connectable between said leveling trigger and the suspension member, said leveling valve being positionable in a first position permitting fluid flow between said inlet passage and the suspension member and a second position preventing fluid flow between said inlet passage and the suspension member.

2. The kneeling system according to claim 1 wherein said supply valve comprises a supply valve poppet member and a supply valve biasing member, said supply valve biasing member biasing said supply valve poppet member into said first position; and
   said exhaust valve comprises an exhaust valve poppet member and an exhaust valve biasing member, said exhaust valve biasing member biasing said exhaust valve poppet member into said first position.

3. The kneeling system according to claim 1 wherein said leveling valve comprises a leveling valve poppet member, said leveling valve poppet member being biased into said first position in response to a control signal from said leveling trigger.

4. The kneeling system according to claim 1 wherein said leveling trigger is fluidly coupled between said inlet passage and said leveling valve, said leveling trigger further having a device for determining a height of the chassis from a predetermined location, said leveling trigger being operable to output a fluid pressure to said leveling valve to position said leveling valve in said first position.

5. The kneeling system according to claim 4, further comprising:
   a leveling solenoid operably coupled to said leveling valve to selectively apply a pilot pressure to said leveling valve, said leveling valve being positionable in said first and second positions in response to a pressure differential between said pilot pressure and said fluid pressure output of said leveling trigger.

6. The kneeling system according to claim 1, further comprising:
   a supply solenoid operably coupled to said supply valve to selectively position said supply valve in said second position; and
   an exhaust solenoid operably coupled to said exhaust valve to selectively position said exhaust valve in said second position.

7. A kneeling system for a transport vehicle, said transport vehicle having a vehicle body and an axle, said kneeling system comprising:
   a suspension member positionable between the vehicle body and the axle of the transport vehicle, said suspension member being operable to raise and lower the transport vehicle relative to a ground level;
   an inlet passage;
   an exhaust passage;
   a first valve fluidly coupled between said inlet passage and said suspension member, said first valve being positionable in a first position preventing fluid flow between said inlet passage and said suspension member and a second position permitting fluid flow between said inlet passage and said suspension member to raise the transport vehicle relative to said ground level;
   a second valve fluidly coupled between said exhaust passage and said suspension member, said second valve being positionable in a first position preventing fluid flow between said suspension member and said exhaust passage and a second position permitting fluid flow between said suspension member and said exhaust passage to lower the transport vehicle relative to said ground level;
   a leveling trigger fluidly coupled to said inlet passage, said leveling trigger being operable to determine a height of the transport vehicle relative to said ground level; and
   a third valve fluidly coupled between said leveling trigger and said suspension member, said third valve being positionable in a first position permitting fluid flow between said inlet passage and said suspension member and a second position preventing fluid flow between said inlet passage and said suspension member to maintain a predetermined height above said ground level.

8. The kneeling system according to claim 7 wherein said first valve includes a first valve poppet member and a first valve biasing member, said first valve biasing member biasing said first valve poppet member into said first position; and
   said second valve includes a second valve poppet member and a second valve biasing member, said second valve biasing member biasing said second valve poppet member into said first position.

9. The kneeling system according to claim 7 wherein said third valve comprises a third valve poppet member, said third valve poppet member being biased into said first position in response to a control signal from said leveling trigger.

10. The kneeling system according to claim 7 wherein said leveling trigger is fluidly coupled between said inlet passage and said third valve, said leveling trigger being operable to output a fluid pressure to said third valve to position said third valve in said first position.

11. The kneeling system according to claim 10, further comprising:

a leveling solenoid operably coupled to said third valve to selectively apply a pilot pressure to said third valve, said third valve being positionable in said first and second positions in response to a pressure differential between said pilot pressure and said fluid pressure output of said leveling trigger.

12. The kneeling system according to claim 7, further comprising:

a supply solenoid operably coupled to said first valve to selectively position said first valve in said second position; and an exhaust solenoid operably coupled to said second valve to selectively position said second valve in said second position.

13. A kneeling system for a transport vehicle, said transport vehicle having a vehicle body and an axle, said kneeling system comprising:

a suspension member positionable between the vehicle body and the axle of the transport vehicle, said suspension member being operable to raise and lower the transport vehicle relative to a ground level;

an inlet passage;

an exhaust passage;

a first poppet valve fluidly coupled between said inlet passage and said suspension member, said first poppet valve being operable to selectively permit fluid flow between said inlet passage and said suspension member to raise the transport vehicle relative to said ground level;

a second poppet valve fluidly coupled between said exhaust passage and said suspension member, said second poppet valve being operable to selectively permit fluid flow between said suspension member and said exhaust passage to lower the transport vehicle relative to said ground level;

a leveling trigger fluidly coupled to said inlet passage, said leveling trigger being operable to determine a height of the transport vehicle relative to said ground level; and a third poppet valve fluidly coupled between said leveling trigger and said suspension member, said third poppet valve being operable to selectively permit fluid flow between said inlet passage and said suspension member to maintain a predetermined height above said ground level.

14. The kneeling system according to claim 13 wherein said first poppet valve includes a first poppet member and a first biasing member, said first biasing member biasing said first poppet member into a closed position; and said second poppet valve includes a second poppet member and a second biasing member, said second biasing member biasing said second poppet member into a closed position.

15. The kneeling system according to claim 13 wherein said third poppet valve comprises a third poppet member, said third poppet member being normally in an opened position in response to a control signal from said leveling trigger.

16. The kneeling system according to claim 13 wherein said leveling trigger is fluidly coupled between said inlet passage and said third poppet valve, said leveling trigger being operable to output a fluid pressure to said third poppet valve to position said third poppet member in said opened position.

17. The kneeling system according to claim 16, further comprising:

a leveling solenoid operably coupled to said third poppet valve to selectively apply a pilot pressure to said third poppet member, said third poppet member being positionable between said opened position and a closed position in response to a pressure differential between said pilot pressure and said fluid pressure output of said leveling trigger.

18. The kneeling system according to claim 13, further comprising:

a supply solenoid operably coupled to said first poppet valve to selectively position said first poppet member in an opened position; and an exhaust solenoid operably coupled to said second poppet valve to selectively position said second poppet member in an opened position.

* * * * *